US012666451B2

(12) United States Patent
Dutta et al.

(10) Patent No.: US 12,666,451 B2
(45) Date of Patent: Jun. 23, 2026

(54) RESOURCE EXCLUSION FOR SIDELINK TRANSMISSION ASSOCIATED WITH RADIO ACCESS TECHNOLOGY BASED ON REFERENCE SIGNAL RECEIVED POWER

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 292 days.

(21) Appl. No.: 18/594,684

(22) Filed: Mar. 4, 2024

(65) Prior Publication Data

US 2024/0349312 A1 Oct. 17, 2024

Related U.S. Application Data

(60) Provisional application No. 63/496,249, filed on Apr. 14, 2023.

(51) Int. Cl.
| | |
|---|---|
| *H04W 72/00* | (2023.01) |
| *H04B 17/318* | (2015.01) |
| *H04W 28/26* | (2009.01) |
| *H04W 72/40* | (2023.01) |
| *H04W 72/563* | (2023.01) |

(52) U.S. Cl.
CPC .......... *H04W 72/40* (2023.01); *H04B 17/328* (2023.05); *H04W 28/26* (2013.01); *H04W 72/563* (2023.01)

(58) Field of Classification Search
CPC ... H04W 72/40; H04W 28/26; H04W 72/563; H04W 92/18; H04B 17/328
See application file for complete search history.

(56) References Cited

U.S. PATENT DOCUMENTS

| | | | | | |
|---|---|---|---|---|---|
| 12,245,199 | B2 * | 3/2025 | Hui | ...................... | H04W 72/02 |
| 2020/0229171 | A1 * | 7/2020 | Khoryaev | ............... | H04W 4/40 |
| 2022/0394744 | A1 * | 12/2022 | Lee | ...................... | H04W 72/20 |
| 2023/0171796 | A1 * | 6/2023 | Ji | ........................ | H04W 72/542 |
| | | | | | 370/329 |
| 2023/0300799 | A1 | 9/2023 | Lee | | |

(Continued)

FOREIGN PATENT DOCUMENTS

WO 2022045718 A1 3/2022

OTHER PUBLICATIONS

International Search Report and Written Opinion—PCT/US2024/018503—ISA/EPO—Jun. 17, 2024.

(Continued)

*Primary Examiner* — Pakee Fang
(74) *Attorney, Agent, or Firm* — Harrity & Harrity, LLP

(57) ABSTRACT

Various aspects of the present disclosure generally relate to wireless communication. Some aspects are directed to enabling co-channel coexistence among UEs. Some aspects may mitigate or prevent collisions between sidelink transmissions, such as collisions between a New Radio (NR) physical sidelink feedback channel (PSFCH) and a Long Term Evolution (LTE) physical sidelink shared channel (PSSCH). Numerous other aspects are described.

20 Claims, 9 Drawing Sheets

700

| NR priority / LTE priority | 0 | 1 | 2 |
|---|---|---|---|
| a | $r_{a,0}$ | $r_{a,1}$ | $r_{a,2}$ |
| b | $r_{b,0}$ | $r_{b,1}$ | $r_{b,2}$ |
| c | $r_{c,0}$ | $r_{c,1}$ | $r_{c,2}$ |

(56) References Cited

U.S. PATENT DOCUMENTS

| | | | | |
|---|---|---|---|---|
| 2023/0319647 A1* | 10/2023 | Wu | ...................... | H04W 28/26 |
| | | | | 370/329 |
| 2023/0389021 A1* | 11/2023 | Liu | ...................... | H04W 28/26 |
| 2025/0380307 A1* | 12/2025 | Hwang | ................ | H04W 72/25 |

OTHER PUBLICATIONS

Nokia, et al., "On Co-Channel Coexistence for LTE Sidelink and NR Sidelink", 3GPP TSG RAN WG1 #112bis-e, e-Meeting, R1-2302291, Type Discussion, NR_SL_ENH2-CORE, 3rd Generation Partnership Project, Mobile Competence Centre, 650, Route Des Lucioles, F-06921 Sophia-Antipolis Cedex, France, vol. 3GPP RAN 1, No. Online, Apr. 17, 2023-Apr. 26, 2023, Apr. 7, 2023, XP052292874, 21 Pages, Sections 1-8, Appendix.

* cited by examiner

500

NR PSFCH

Higher signal strength over a few symbols

Lower signal strength if the slot does not include an NR PSCCH transmission

Overlapping LTE transmission

LTE PSSCH

NR PSFCH

| NR priority / LTE priority | 0 | 1 | 2 |
|---|---|---|---|
| a | $r_{a,0}$ | $r_{a,1}$ | $r_{a,2}$ |
| b | $r_{b,0}$ | $r_{b,1}$ | $r_{b,2}$ |
| c | $r_{c,0}$ | $r_{c,1}$ | $r_{c,2}$ |

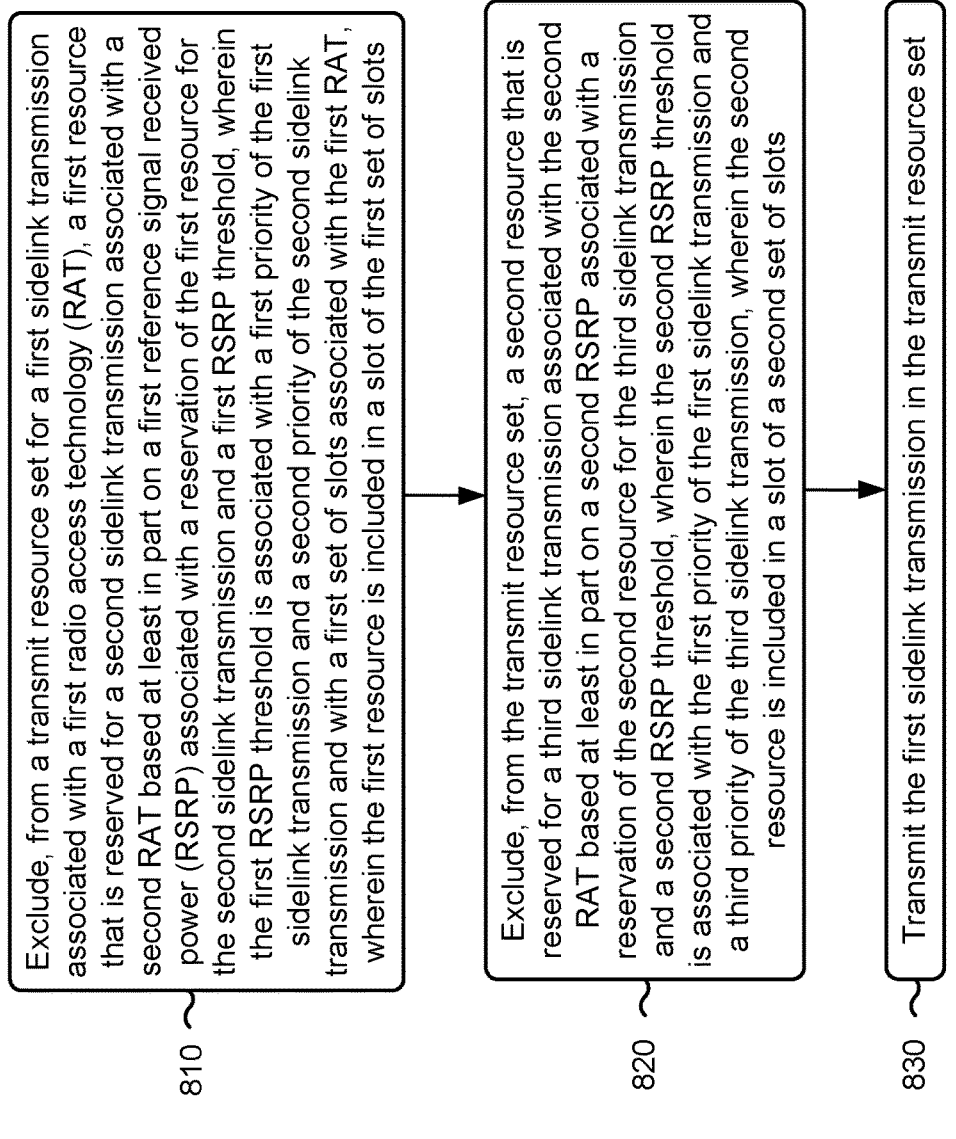

810 — Exclude, from a transmit resource set for a first sidelink transmission associated with a first radio access technology (RAT), a first resource that is reserved for a second sidelink transmission associated with a second RAT based at least in part on a first reference signal received power (RSRP) associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots 820 — Exclude, from the transmit resource set, a second resource that is reserved for a third sidelink transmission associated with the second RAT based at least in part on a second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots 830 — Transmit the first sidelink transmission in the transmit resource set

RESOURCE EXCLUSION FOR SIDELINK TRANSMISSION ASSOCIATED WITH RADIO ACCESS TECHNOLOGY BASED ON REFERENCE SIGNAL RECEIVED POWER

CROSS-REFERENCE TO RELATED APPLICATION

This patent application claims priority to U.S. Provisional Patent Application No. 63/496,249, filed on Apr. 14, 2023, entitled "RESOURCE EXCLUSION FOR SIDELINK TRANSMISSION," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for resource exclusion for sidelink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks May support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a UE for wireless communication. The user equipment (UE) may include a memory and one or more processors coupled to the memory. The one or more processors may be configured to exclude, from a transmit resource set for a first sidelink transmission associated with a first radio access technology (RAT), a first resource that is reserved for a second sidelink transmission associated with a second RAT based at least in part on a first reference signal received power (RSRP) associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots. The one or more processors may be configured to exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots. The one or more processors may be configured to transmit the first sidelink transmission in the transmit resource set.

Some aspects described herein relate to a method of wireless communication performed by a UE. The method may include excluding, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots; excluding, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots; and transmitting the first sidelink transmission in the transmit resource set.

Some aspects described herein relate to a non-transitory computer-readable medium that stores a set of instructions for wireless communication by a UE. The set of instructions, when executed by one or more processors of the UE, may cause the UE to exclude, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots. The set of instructions, when executed by one or more processors of the UE, may cause the UE to exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots. The set of instructions, when executed by one or more processors of the UE, may cause the UE to transmit the first sidelink transmission in the transmit resource set.

Some aspects described herein relate to an apparatus for wireless communication. The apparatus may include means for excluding, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots. The apparatus may include means for excluding, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots. The apparatus may include means for transmitting the first sidelink transmission in the transmit resource set.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating a table that includes reference signal received power (RSRP) thresholds associated with a first set of slots, in accordance with the present disclosure.

FIG. 8 is a diagram illustrating an example process performed, for example, by a UE, in accordance with the present disclosure.

DETAILED DESCRIPTION

Figure 1:
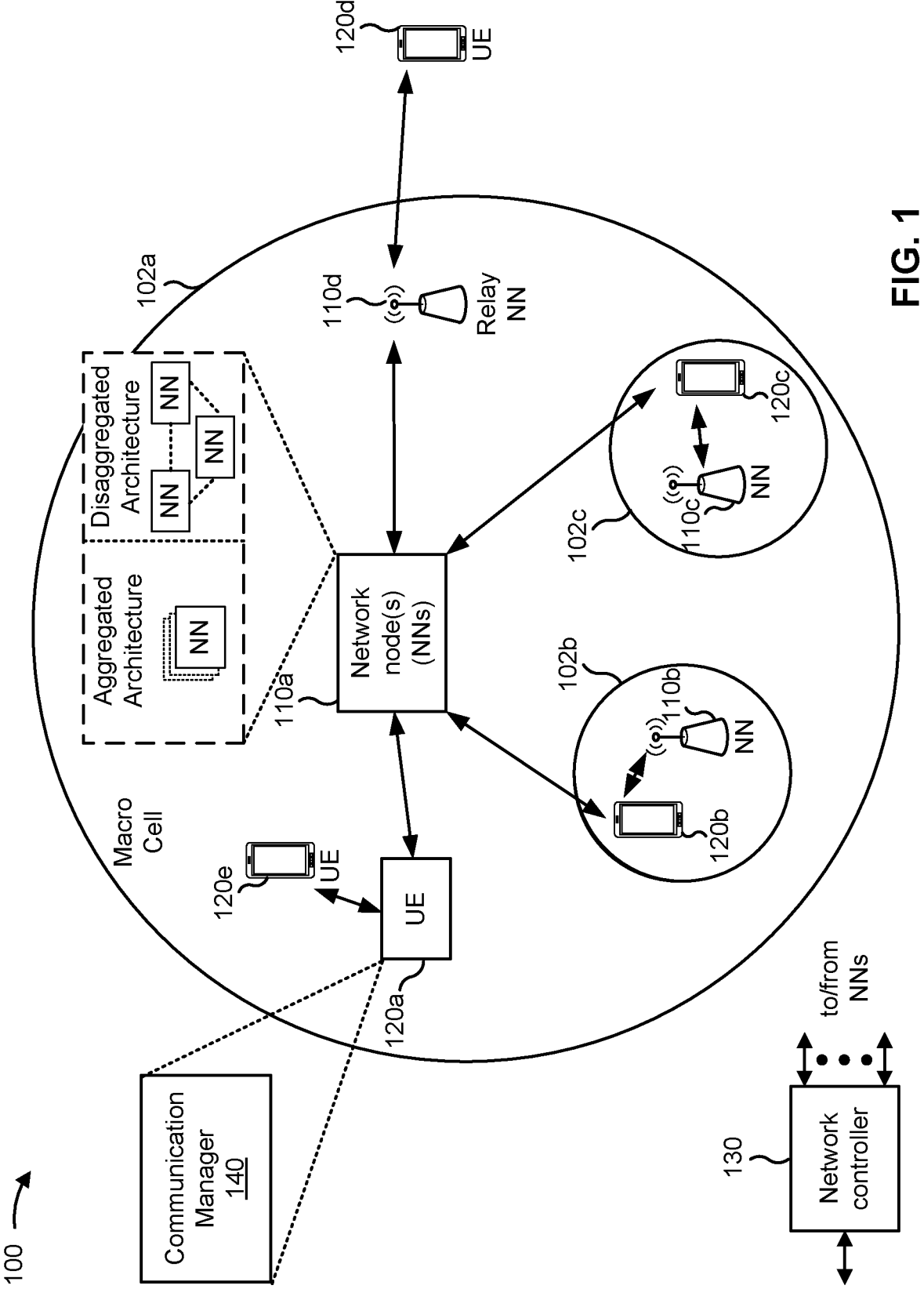
FIG. 1 is a diagram illustrating an example of a wireless network, in accordance with the present disclosure.

When a sidelink transmission of a first radio access technology (RAT) (e.g., New Radio (NR)) and a sidelink transmission of a second RAT (e.g., Long Term Evolution (LTE)) are transmitted in the same resource, a collision between the transmissions can occur. In some examples, an NR physical sidelink shared channel (PSSCH) transmission can collide with an LTE sidelink PSSCH transmission, which may cause high interference at the intended receivers and lead to decode failure. In some examples, when an NR physical sidelink feedback channel (PSFCH) and an LTE PSSCH are transmitted over the same resource, the NR PSFCH can saturate, in the middle of a subframe, an LTE receiver device with high power and/or create clipping or quantization noise, which may render the LTE PSSCH undecodable and lead to packet loss.

Various aspects relate generally to wireless communication and more particularly to enabling co-channel coexistence among at least a first user equipment (UE) and a second UE. Some aspects more specifically relate to techniques for mitigating or preventing collisions between sidelink transmissions, such as collisions between NR PSFCHs and LTE PSSCHs. In some examples, the first UE (e.g., a Type A UE) may be configured for at least the first RAT with a sidelink configuration for resource exclusion to enable co-channel coexistence with a second UE configured for the second RAT (e.g., such that an NR UE may operate an NR sidelink over a channel shared with an LTE sidelink).

In some examples, the first UE may determine whether to include a resource in a transmit resource set (e.g., an NR transmit resource set) based at least in part on a priority associated with a first transmission (e.g., an NR transmission) and a priority associated with a second transmission (e.g., an LTE transmission). For example, the first UE may use the priorities to determine a reference signal received power (RSRP) threshold and, based at least in part on the RSRP threshold and an RSRP associated with a reservation of the second transmission, the first UE may exclude (or include) the resource in the transmit resource set (e.g., a transmit resource set for the first transmission). As a result, based at least in part on the priorities, the RSRP, and the RSRP threshold, the first UE may determine whether the first transmission is to share the resource with the second transmission.

In some aspects, a UE (e.g., a Type A UE) may exclude, from a transmit resource set for a first sidelink transmission associated with a first RAT (e.g., NR), a first resource that is reserved for a second sidelink transmission associated with a second RAT (e.g., LTE) based at least in part on a first RSRP associated with a reservation of the first resource for the second sidelink transmission and a first RSRP threshold. The first RSRP threshold may be associated with a first priority of the first sidelink transmission (e.g., a priority associated with NR) and a second priority of the second sidelink transmission (e.g., a priority associated with LTE) and with a first set of slots associated with the first RAT, and the first resource may be included in a slot of the first set of slots.

The UE may further exclude, from the transmit resource set, a second resource that is reserved for a third sidelink transmission associated with the second RAT based at least in part on a second RSRP associated with a reservation of the second resource for the third sidelink transmission and a second RSRP threshold. The second RSRP threshold may be associated with the first priority of the first sidelink transmission and a third priority of the third sidelink transmission (e.g., a priority associated with LTE), and the second resource may be included in a slot of a second set of slots. The UE may transmit the first sidelink transmission in the transmit resource set. In some examples, the first set of slots may not include any PSFCH resource, and each slot of the second set of slots may include one or more PSFCH resources.

Particular aspects of the subject matter described in this disclosure can be implemented to realize one or more of the following potential advantages. In some examples, by excluding the first resource from the transmit resource set for the first sidelink transmission the described techniques can be used to prevent collisions between the first sidelink transmission (e.g., an NR transmission) and the second sidelink transmission (e.g., an LTE transmission). For example, the UE may prevent a collision between the first sidelink transmission and second sidelink transmission in the first resource, which may be included in a slot that does not include a PSFCH resource. As a result, the first sidelink transmission and/or the second sidelink transmission may be successfully transmitted (e.g., not dropped).

Furthermore, by excluding the second resource from the transmit resource set for the second sidelink transmission, the described techniques may prevent collisions between the first sidelink transmission (e.g., an NR transmission) and the third sidelink transmission (e.g., an LTE transmission). For example, the UE may prevent a collision between the first sidelink transmission and the third sidelink transmission in the second resource, which may be included in a slot that includes a PSFCH resource. For example, the UE may prevent a collision between an NR PSFCH and an LTE PSSCH. As a result, the first sidelink transmission and/or the third sidelink transmission may be successfully transmitted (e.g., not dropped). Moreover, providing a second RSRP threshold associated with the first set of slots (e.g., rather than associating the first RSRP threshold with both the first set of slots and the second set of slots) may enable the first RSRP threshold to be pre-configured or configured for the first set of slots and the second RSRP threshold to be pre-configured or configured for the second set of slots.

In some aspects, the first RSRP threshold may be one of multiple first RSRP thresholds associated with the first set of slots, and the second RSRP threshold may be based at least in part on an offset from one of the first RSRP thresholds. Basing the second RSRP threshold at least in part on the offset (e.g., instead of configuring or pre-configuring the UE with multiple second RSRP thresholds) may reduce storage and/or processing requirements.

In some aspects, the UE may exclude the second resource based at least in part on the second RSRP satisfying a sum of the second RSRP threshold and an RSRP threshold adaptation parameter value. Excluding the NR sidelink transmission based at least in part on the RSRP associated with the reservation of the resource satisfying the sum of the RSRP threshold and the RSRP threshold adaptation parameter value may help to ensure that the UE can transmit the NR sidelink transmission. For example, the RSRP threshold adaptation parameter may help to ensure that the UE does not exclude all candidate resources from the transmit resource set for the NR sidelink transmission, even if all of the candidate resources satisfy the RSRP threshold.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may exclude, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots; exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots; and transmit the first sidelink transmission in the transmit resource set. Additionally, or alternatively, the communication manager 140 may perform one or more other operations described herein.

As indicated above, FIG. 1 is provided as an example. Other examples may differ from what is described with regard to FIG. 1.

Figure 2:
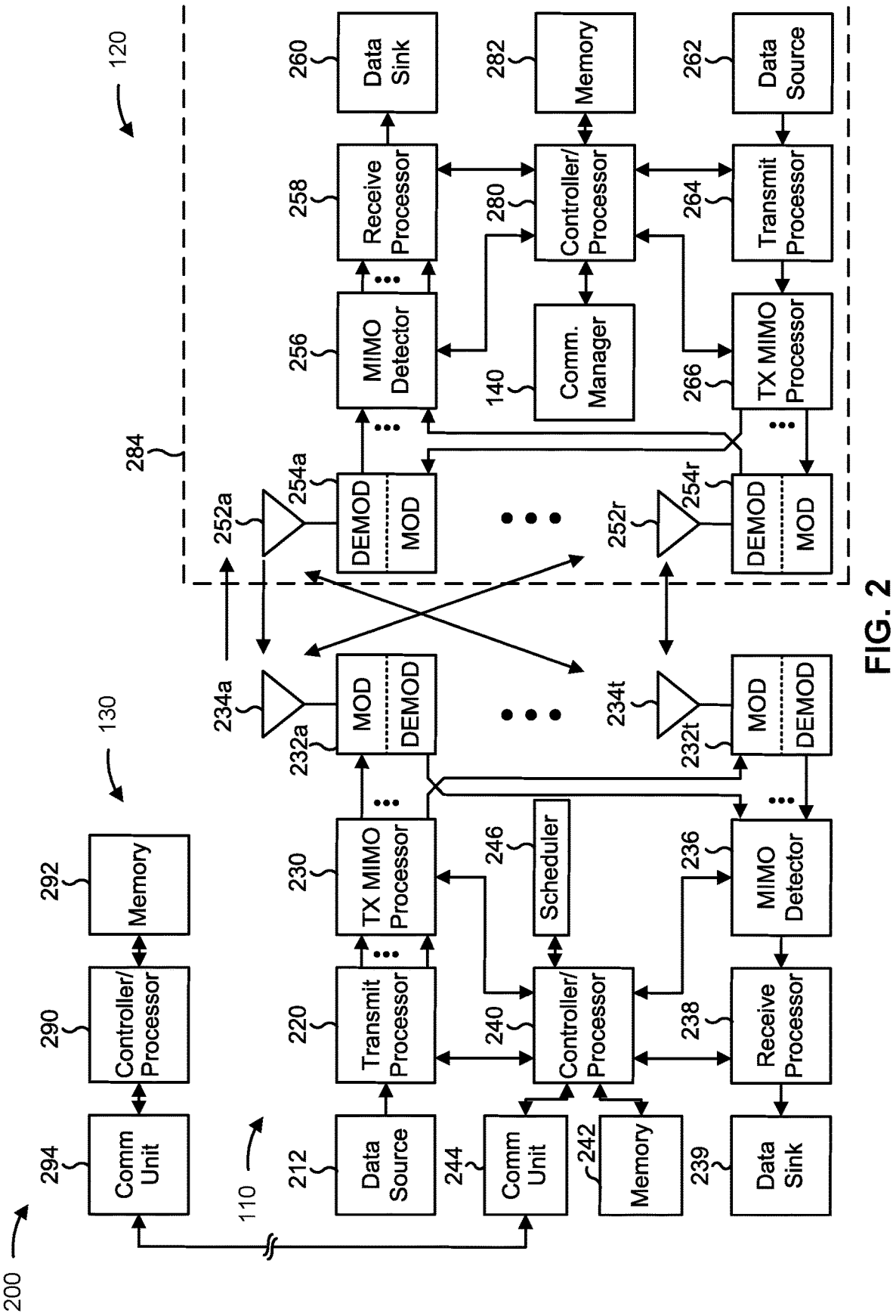
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a RSRP parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230.

The controller/processor 240 of the network node 110, the controller/processor 280 of the UE 120, and/or any other component(s) of FIG. 2 may perform one or more techniques associated with resource exclusion for sidelink transmission, as described in more detail elsewhere herein. For example, the controller/processor 280 of the UE 120 and/or any other component(s) of FIG. 2 may perform or direct operations of, for example, process 800 of FIG. 8 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors, the UE 120, and/or the network node 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, UE 120 may include means for excluding, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots, means for excluding, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots, means for transmitting the first sidelink transmission in the transmit resource set, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (ENB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
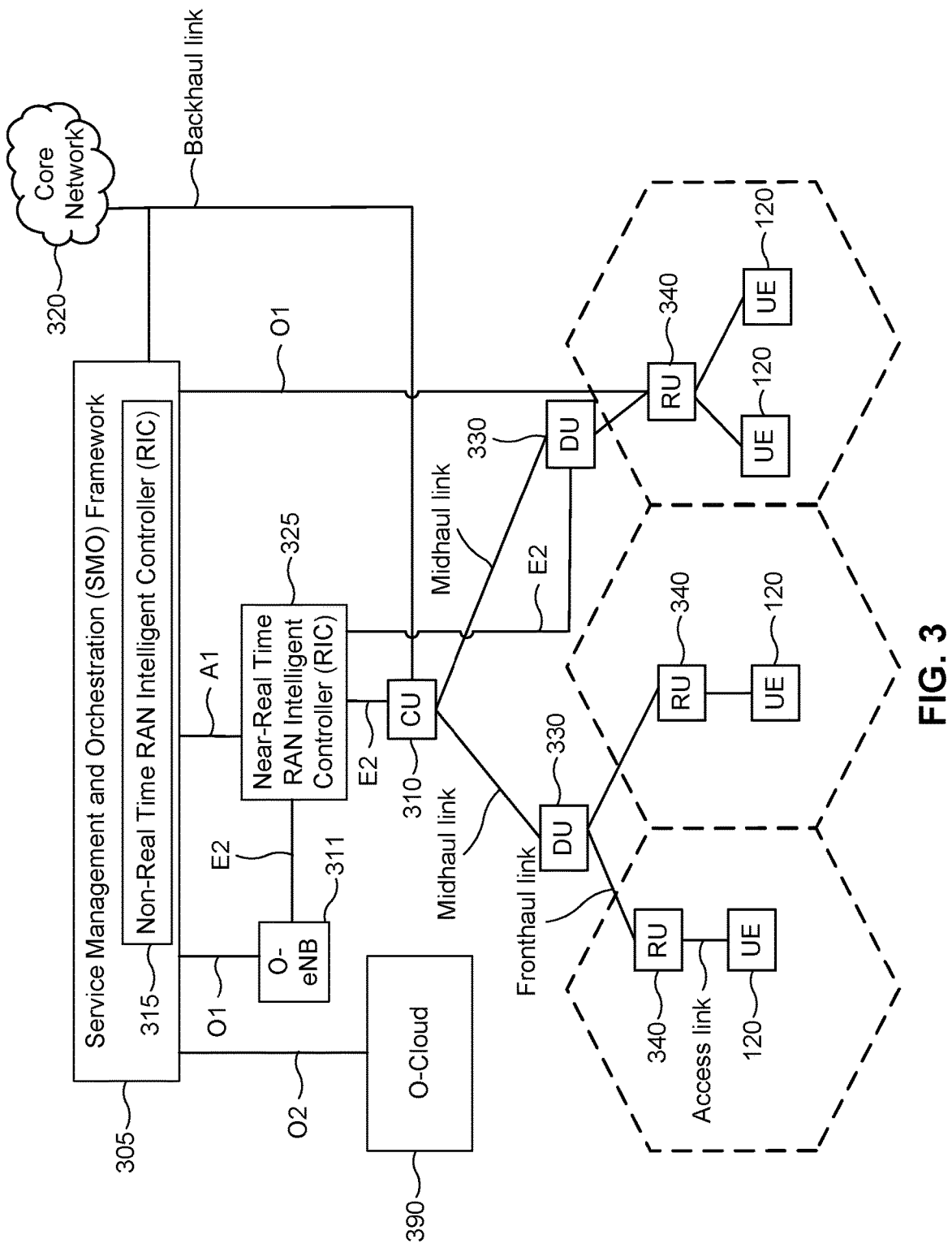
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
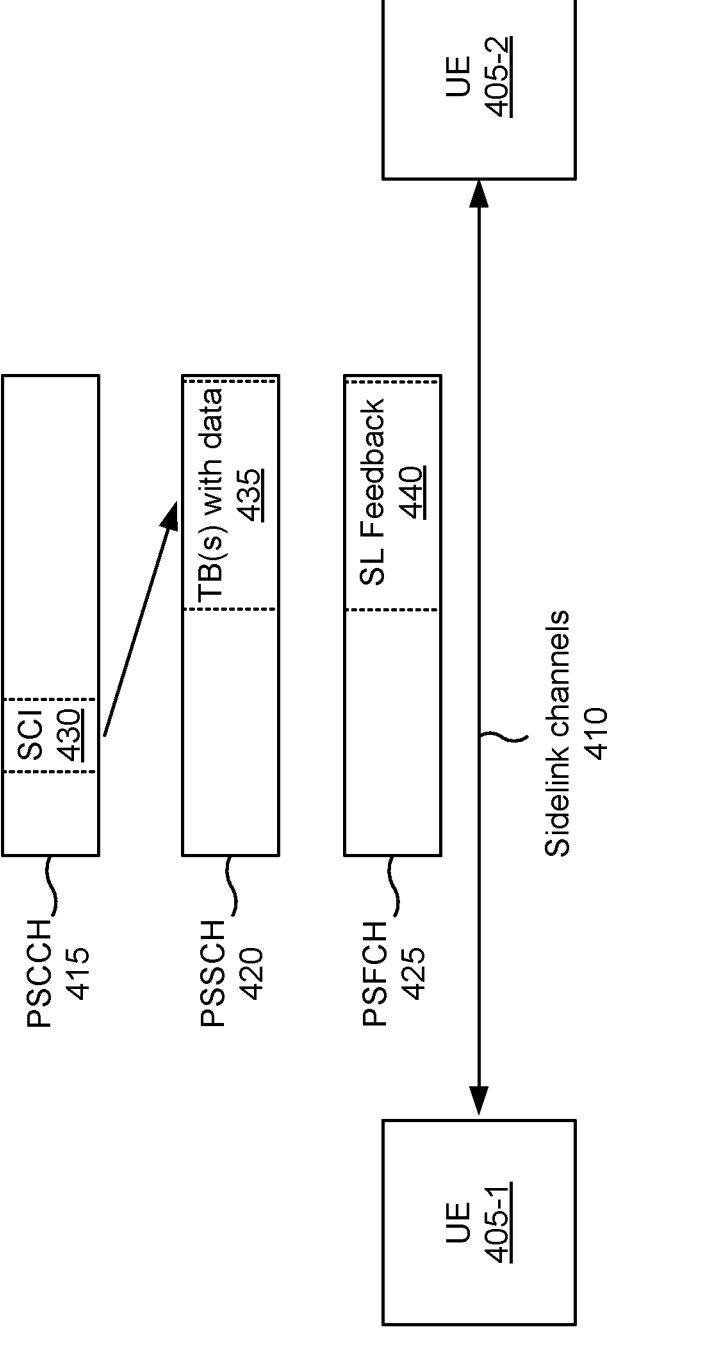
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a PSSCH 420, and/or a PSFCH 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel.

For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. For example, a network node 110 may transmit, to a UE (e.g., UE 405-1 and/or UE 405-2) one or more sidelink grants that indicate resources (e.g., time resources, frequency resources, and/or spatial resources) that can be used by the UE to transmit the TB 435 on the PSSCH 420. A sidelink grant may include a dynamic grant and/or a configured grant (CG), among other examples.

The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some other cases, the UE 405 may operate in a transmission mode where resource selection and/or scheduling is performed by a network node 110. For example, the network node 110 may generate sidelink grants, and may transmit the grants in control information (e.g., PDCCH messages, RRC messages, or downlink control information (DCI) messages). For example, the network node 110 may indicate one or more sidelink grants to the UE 405. The UE 405 may use a sidelink grant (indicated and/or configured by the network node 110) to transmit the TB 435 on the PSSCH 420 (e.g., to transmit data on the sidelink channel). The transmission mode where resource selection and/or scheduling for sidelink data is performed by a network node 110 may be referred to as a "mode 1" or a "transmission mode 1." The transmission mode where resource selection and/or scheduling for sidelink data is performed by a UE may be referred to as a "mode 2" or a "transmission mode 2."

As indicated above, FIG. 4 is provided as an example. Other examples may differ from what is described with respect to FIG. 4.

LTE sidelink and NR sidelink may co-exist in the same channel. For example, dual-mode UEs configured for NR sidelink communications and LTE sidelink communications (e.g., Type A UEs) may coexist with legacy LTE-only UEs (e.g., Type C UEs) using dynamic resource pool sharing.

A Type A UE may include an NR sidelink module (e.g., including a modem configured for NR sidelink communications) and an LTE sidelink module (e.g., including a modem configured for LTE sidelink communications). In some examples, the NR sidelink module may use LTE sidelink reservation information received from one or more UEs configured for LTE sidelink communications to determine a candidate resource set for NR sidelink. For example, during an NR sidelink selection (or reselection) procedure, the Type A UE may determine the candidate resource set based on the LTE sidelink resources that are reserved by the UE(s) configured for LTE sidelink communications based on the LTE sidelink reservation information.

The PHY layer of the NR sidelink module may exclude NR sidelink candidate resources that overlap with LTE sidelink resources that are reserved by one or more UEs configured for LTE sidelink communications when a sidelink RSRP value associated with an LTE sidelink reserved resource is greater than a sidelink RSRP threshold. In some examples, the sidelink RSRP threshold may be derived based on an LTE sidelink priority associated with a UE configured for LTE sidelink communications and an NR sidelink priority for an NR sidelink transmission.

At least four aspects may be employed to determine a sidelink RSRP threshold. The first aspect may involve an NR sidelink RSRP threshold list that is configured (or pre-configured) in an NR sidelink resource pool. The second aspect may involve an LTE sidelink RSRP threshold list that is configured (or pre-configured) in an LTE sidelink resource pool. A third aspect may involve a sidelink RSRP threshold list that is separately configured (or pre-configured) for dynamic resource pool sharing. A fourth aspect may involve a sidelink RSRP threshold list that is separately configured (or pre-configured) for dynamic resource pool sharing, where a different sidelink RSRP threshold list may be configured (or pre-configured) for selecting single slot resources in NR sidelink slots configured to carry NR PSFCH.

To determine periodic LTE sidelink resources that are reserved by one or more UEs configured for LTE sidelink communications, the time and frequency resources of LTE sidelink resources reserved by the UE(s) configured for LTE sidelink communications may be repeated Q times according to the LTE sidelink resource reservation period.

In one example of NR-sidelink-LTE-sidelink co-channel coexistence, Type A UEs may coexist in a shared resource pool with Type C UEs. NR-sidelink-LTE-sidelink co-channel coexistence may involve out-of-coverage scenarios for NR sidelink (e.g., mode 2) and/or LTE sidelink (e.g., mode 4). An LTE module of a Type A device may receive LTE resource reservation information from one or more UEs that reserved the resource and provide the information (e.g., via a common hardware bus) to an NR module of the Type A device. For example, the LTE resource reservation information may include one or more of time-frequency resources for transmissions and receptions, RSRP associated with the reservation information received from the UE(s) that reserved the resource, or a priority associated with the network traffic or the resource reservation.

Figure 5:
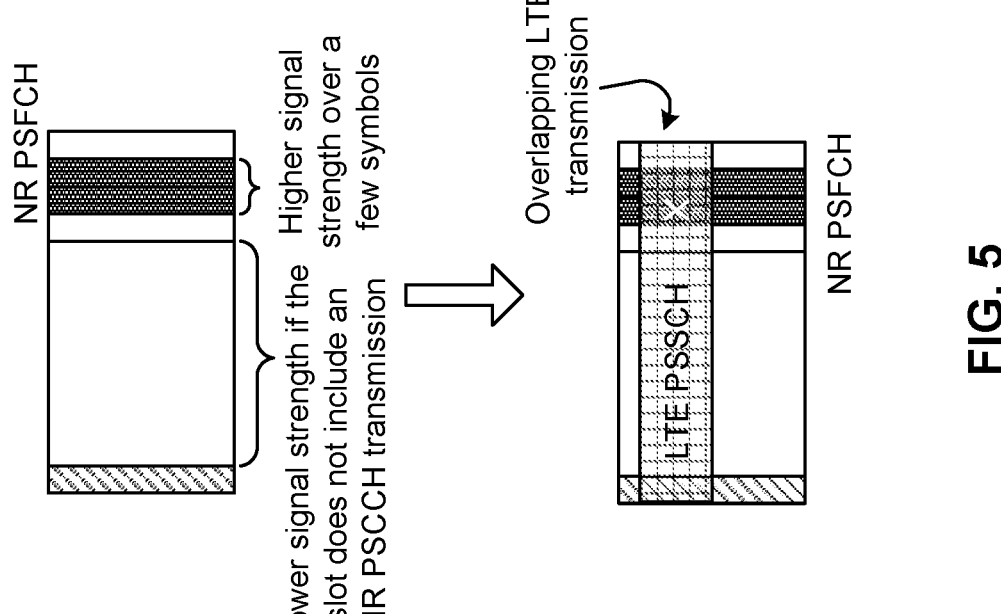
FIG. 5 is a diagram illustrating an example of a collision between a New Radio (NR) physical sidelink feedback channel (PSFCH) and a Long Term Evolution (LTE) physical sidelink shared channel (PSSCH), in accordance with the present disclosure.

FIG. 5 is a diagram illustrating an example 500 of a collision between an NR PSFCH and an LTE PSSCH, in accordance with the present disclosure. In example 500, the NR PSFCH and the LTE PSSCH are transmitted on overlapping resources in the time domain, which may impact an LTE UE configured to receive the LTE PSSCH. For example, the LTE UE may include a receiver having a dynamic range that is set based on automatic gain control (AGC). The LTE UE may set the AGC based on the beginning of the subframe and then use that same AGC setting for the entire subframe. As shown, the beginning of the slot includes an LTE PSSCH but no NR PSFCH. Thus, the AGC is set based on the LTE PSSCH. However, the LTE UE may receive higher power after the beginning of the slot (e.g., after the AGC has been set). Thus, for example, the NR PSFCH may saturate a circuit of the LTE device (e.g., the analog-to-digital circuit (ADC)) with high power. For example, the NR PSFCH may create clipping or quantization noise, which may render the LTE PSSCH undecodable. As a result, the NR PSFCH may lead to packet loss.

As indicated above, FIG. 5 is provided as an example. Other examples may differ from what is described with respect to FIG. 5.

Some techniques and apparatuses described herein enable a UE (e.g., a Type A UE) to prevent sidelink collisions between transmissions of a first RAT (e.g., NR) and a second RAT (e.g., LTE). For example, the techniques and apparatuses described herein may enable the UE to prevent the collision between the NR PSFCH and the LTE PSSCH illustrated in FIG. 5.

Figure 6:
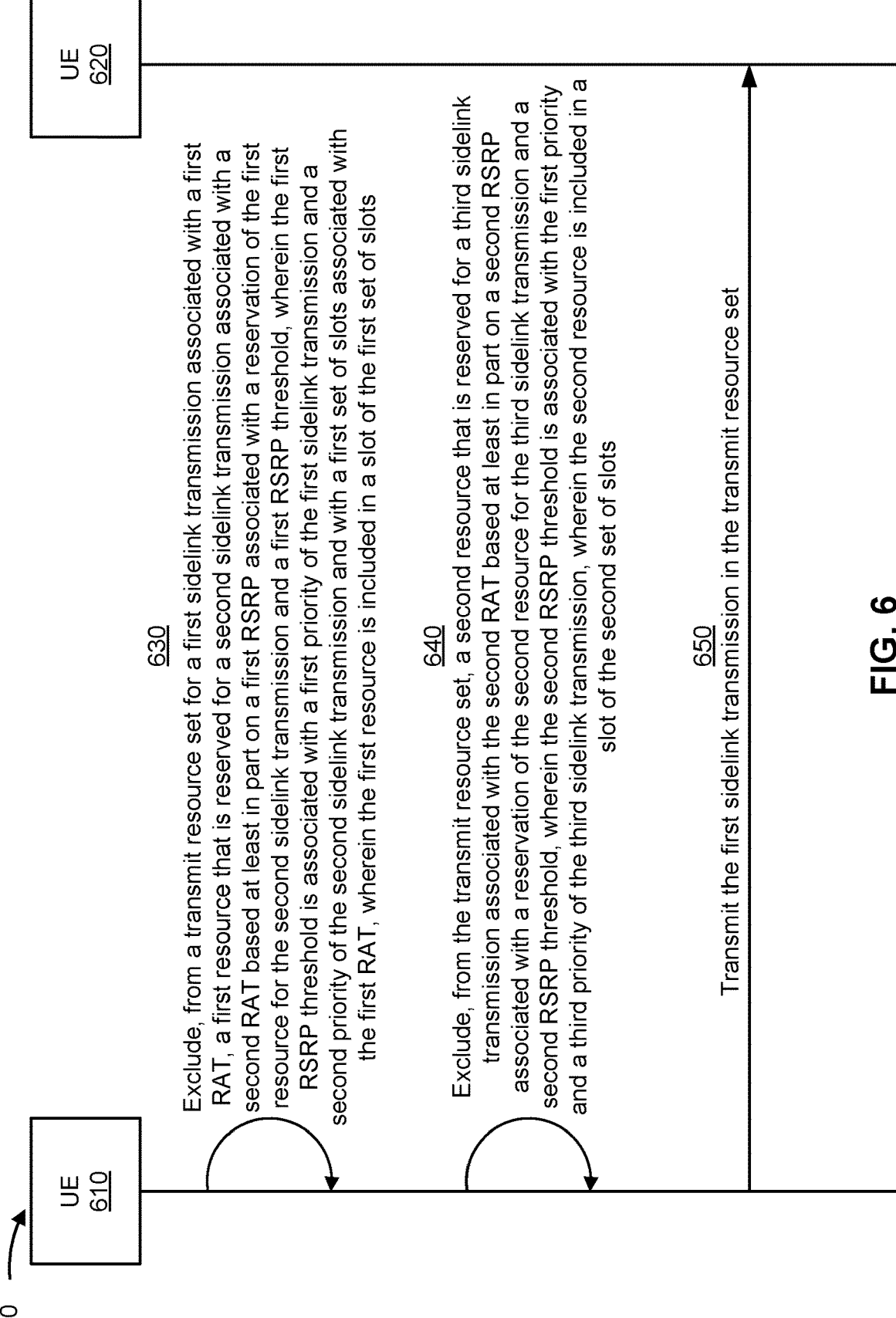
FIG. 6 is a diagram illustrating an example associated with resource exclusion for a sidelink transmission, in accordance with the present disclosure.

FIG. 6 is a diagram illustrating an example 600 associated with resource exclusion for a sidelink transmission, in accordance with the present disclosure. As shown in FIG. 6, example 600 includes communication between a UE 610 and a UE 620. The UE 610 and the UE 620 may communicate via a wireless link, which may include a sidelink. Example 600 relates to an NR sidelink configuration for resource exclusion for co-channel coexistence. For example, FIG. 6 may illustrate operations performed by a UE configured for NR sidelink (e.g., a Type A UE) with respect to a channel shared with an LTE sidelink.

As shown by reference number 630, the UE 610 may exclude, from a transmit resource set for a first sidelink transmission associated with a first RAT (e.g., NR), a first resource that is reserved for a second sidelink transmission associated with a second RAT (e.g., LTE). The UE 610 may exclude the first resource based at least in part on a first RSRP associated with a reservation of the first resource for the second sidelink transmission. For example, the UE 610 may be a Type A UE that receives resource reservation information for the second sidelink transmission from an LTE UE. For example, the UE 610 may measure an RSRP of a transmission containing the resource reservation information over the LTE sidelink PSCCH and/or the LTE sidelink PSSCH.

The UE 610 may exclude the first resource based further at least in part on a first RSRP threshold. The first RSRP threshold may be associated with a first priority of the first sidelink transmission and a second priority (e.g., LTE proximity service per-packet priority (pPPP)) of the second sidelink transmission. For example, the resource reservation information may include an indication of the second priority of the second sidelink transmission. The first RSRP threshold may also be associated with a first set of slots associated with the first RAT (e.g., the first RSRP threshold may be associated with a first set of NR slots). The first resource may be included in a slot of the first set of slots. For example, the first set of slots may not include any PSFCH resources.

Excluding the first resource from the transmit resource set for the first sidelink transmission may prevent collisions between the first sidelink transmission (e.g., an NR transmission) and the second sidelink transmission (e.g., an LTE transmission). For example, the UE 610 may prevent a collision between the first sidelink transmission and second sidelink transmission in the first resource, which may be included in a slot that does not include a PSFCH resource. As a result, the first sidelink transmission and/or the second sidelink transmission may be successfully transmitted (e.g., not dropped).

As shown by reference number 640, the UE 610 may exclude, from the transmit resource set for the first sidelink transmission, a second resource that is reserved for a third sidelink transmission associated with the second RAT. The UE 610 may exclude the second resource based at least in part on a second RSRP associated with a reservation of the second resource for the third sidelink transmission. For example, UE 610 may receive resource reservation information for the third sidelink transmission from an LTE UE. For example, the UE 610 may measure an RSRP of a transmission containing the resource reservation information over the LTE sidelink PSCCH and/or the LTE sidelink PSSCH.

The UE 610 may exclude the second resource based further at least in part on a second RSRP threshold. The second RSRP threshold may be associated with the first priority of the first sidelink transmission and a third priority (e.g., LTE pPPP) of the third sidelink transmission. For example, the resource reservation information may include an indication of the third priority of the third sidelink transmission. In some aspects, the second resource may be included in a slot of the second set of slots. For example, each slot of the second set of slots may include one or more PSFCH resources.

Excluding the second resource from the transmit resource set for the second sidelink transmission may prevent collisions between the first sidelink transmission (e.g., an NR transmission) and the third sidelink transmission (e.g., an LTE transmission). For example, the UE 610 may prevent a collision between the first sidelink transmission and the third sidelink transmission in the second resource, which may be included in a slot that includes a PSFCH resource. For example, the UE 610 may prevent the collision shown in example 500 (FIG. 5). As a result, the first sidelink transmission and/or the third sidelink transmission may be successfully transmitted (e.g., not dropped). Furthermore, providing a second RSRP threshold associated with the first set of slots (e.g., rather than associating the first RSRP threshold with both the first set of slots and the second set of slots) may enable the first RSRP threshold to be pre-configured or configured for the first set of slots and the second RSRP threshold to be pre-configured or configured for the second set of slots.

As shown by reference number 650, the UE 610 may transmit the first sidelink transmission in the transmit resource set for the first sidelink transmission. Because the first sidelink transmission may be transmitted in the transmit resource set, whereas the third sidelink transmission may be transmitted in the first resource (which is excluded from the transmit resource set), UE 610 may avoid a collision between the first sidelink transmission and the third sidelink transmission.

As indicated above, FIG. 6 is provided as an example. Other examples may differ from what is described with respect to FIG. 6.

FIG. 7 is a diagram illustrating a table 700 that includes RSRP thresholds associated with the first set of slots (e.g., slots that do not include any PSFCH resources), in accordance with the present disclosure. For example, the table 700 may include a list of RSRP thresholds for resource exclusion over NR slots (e.g., NR PSSCH slots) without a PSFCH. In some examples, the RSRP thresholds may be selected based on LTE sidelink reservations.

In some aspects, UE 610 may be configured (or pre-configured) with table 700 and another table that includes RSRP thresholds associated with the second set of slots (e.g., slots that each include a PSFCH resource). The other table may include a list of RSRP thresholds for resource exclusions over NR slots with a PSFCH. The RSRP thresholds in table 700 may be the same as or different from the RSRP thresholds in the other table.

In the example of FIG. 7, there are three levels of priority for NR transmissions (0, 1, and 2) and three levels of priority for LTE transmissions (a, b, and c). Table 700 includes a first set of values for RSRP thresholds, each corresponding to a respective combination of priority for NR transmissions and priority for LTE transmissions (e.g., $r_{i,j}$). The other table may include a second set of values for RSRP thresholds, each corresponding to a respective combination of priority for NR transmissions and priority for LTE transmissions (e.g., $s_{i,j}$). For example, one of the RSRP thresholds shown in table 700 may be the first RSRP threshold (FIG. 6), and/or one of the RSRP thresholds in the other table may be the second RSRP threshold (FIG. 6).

For example, the UE 610 may receive resource reservation information regarding an LTE sidelink transmission with priority a. In this example, $r_{a,0}$ or $s_{a,0}$ may be equal to −90 dBm, and $r_{a,2}$ or $s_{a,2}$ may be equal to −100 dBm. If the UE 610 is preparing to transmit an NR sidelink transmission with priority 0, then a resource that is reserved for the LTE sidelink transmission may be excluded based on the RSRP of a transmission carrying the resource reservation information and the −90 dBm RSRP threshold (e.g., if the RSRP is −90 dBm or higher, then the UE 610 may exclude the resource from the resource transmit set of the NR sidelink transmission). Or, if the UE 610 is preparing to transmit an NR sidelink transmission with priority 2, then a resource that is reserved for the LTE sidelink transmission may be excluded based on the RSRP of a transmission carrying the resource reservation information and the −100 dBm RSRP threshold (e.g., if the RSRP is −100 dBm or higher, then the UE 610 may exclude the resource from the resource transmit set of the NR sidelink transmission).

Thus, in some examples, the higher the NR priority, the higher the RSRP required to exclude the resource from the transmit resource set. As a result, resources reserved for LTE sidelink transmissions may be more readily excluded from a transmit resource set for higher-priority NR sidelink transmissions, thereby helping to ensure that the higher-priority NR sidelink transmissions are transmitted successfully. Conversely, in some examples, the higher the LTE priority, the lower the RSRP required to exclude the resource from the transmit resource set. As a result, resources reserved for higher-priority LTE sidelink transmissions may be more readily excluded from a transmit resource set for NR sidelink transmissions, thereby helping to ensure that the higher-priority LTE sidelink transmissions are transmitted successfully.

In some aspects, UE 610 may be configured (or pre-configured) with table 700 (e.g., and not configured or pre-configured with the other table). For instance, the second RSRP threshold (FIG. 6) may be based at least in part on an offset (e.g., an RSRP difference Θ) from one of the RSRP thresholds included in table 700. The offset may be an RSRP difference Θ for determining a resource exclusion threshold for NR slots with a PSFCH resource. Basing the second RSRP threshold at least in part on the offset may reduce storage and/or processing requirements (e.g., because the UE 610 may not be configured or pre-configured with the other table).

In some examples, the offset may be associated with each of the RSRP thresholds included in table 700 (e.g., the offset may be fixed). For example, the second RSRP threshold may be determined as $r_{i,j}$−Θ. Thus, a sidelink resource in a slot with a PSFCH resource may be excluded from the NR resource transmit set if the resource would collide with an LTE reservation associated with a RSRP≥$r_{i,j}$−Θ. Associating the offset with each of the RSRP thresholds included in table 700 may further reduce storage and/or processing requirements (e.g., because the UE 610 may be configured or pre-configured with only one offset value).

In some examples, the offset may be one of multiple offsets associated with the respective RSRP thresholds included in table 700. For example, respective values of Θ may be defined based on respective NR traffic priorities and/or LTE traffic priorities. For example, each $r_{i,j}$ may have an associated $Θ_{i,j}$. Associating multiple offsets with respective RSRP thresholds may enable configuration (or pre-configuration) of specific offsets for each $r_{i,j}$.

For clarity, it is noted that RSRP threshold configuration (or pre-configuration) for exclusion based on LTE sidelink reservations, as described herein, is different from RSRP threshold configuration (or pre-configuration) used for exclusion based on NR sidelink sensing.

In some aspects, a resource that is reserved for an LTE sidelink transmission (e.g., a resource that is included in the second set of slots, such as a resource that is included in a slot that includes a PSFCH resource) may be excluded from a transmit resource set for an NR sidelink transmission based at least in part on the RSRP associated with the reservation of the resource satisfying an RSRP threshold. For example, the UE 610 may be configured (or pre-configured) to have a fixed RSRP threshold for each priority combination. For example, if the RSRP threshold is −90 dBm, then the UE 610 may exclude the resource from the resource transmit set of the NR sidelink transmission if the RSRP is −90 dBm or higher, and the UE 610 may include the resource from the resource transmit set of the NR sidelink transmission if the RSRP is less than −90 dBm. Excluding the resource based at least in part on the RSRP satisfying the RSRP threshold may prevent collisions between the NR sidelink transmission and the LTE sidelink transmission based on the configurable (or pre-configurable) RSRP threshold.

In some aspects, a resource that is reserved for an LTE sidelink transmission (e.g., a resource that is included in the second set of slots, such as a resource that is included in a slot that includes a PSFCH resource) may be excluded from a transmit resource set for an NR sidelink transmission based at least in part on the RSRP associated with the reservation of the resource satisfying a sum of an RSRP threshold and an RSRP threshold adaptation parameter value. For example, the UE 610 may be configured (or pre-configured) with a threshold adaptation parameter A.

Excluding the NR sidelink transmission based at least in part on the RSRP associated with the reservation of the resource satisfying the sum of the RSRP threshold and the RSRP threshold adaptation parameter value may help to ensure that the UE 610 can transmit the NR sidelink transmission. For example, the RSRP threshold adaptation parameter may help to ensure that the UE 610 does not exclude all candidate resources from the transmit resource set for the NR sidelink transmission (e.g., based on the RSRP satisfying the RSRP threshold). In some examples, if the UE 610 excludes all of the candidate resources from the transmit resource set based on the RSRP satisfying the RSRP threshold, then the UE 610 may determine whether any of the candidate resources satisfy the sum of the RSRP threshold and the RSRP threshold adaptation parameter value. The UE 610 may include one or more of the candidate resources that satisfy the sum of the RSRP threshold and the RSRP threshold adaptation parameter value in the transmit resource set, even if those one or more candidate resources did not satisfy the RSRP threshold.

In some examples, the RSRP threshold may be one of multiple RSRP thresholds (e.g., as shown in table 700), and the RSRP threshold adaptation parameter value may be associated with each of the RSRP thresholds. For example, the value of A may be fixed across all RSRP thresholds. Associating the RSRP threshold adaptation parameter value with each of the RSRP thresholds may reduce storage and/or processing requirements (e.g., because the UE 610 may be configured or pre-configured with only one RSRP threshold adaptation parameter value).

In some examples, the RSRP threshold adaptation parameter value may be one of multiple RSRP threshold adaptation parameter values associated with respective priorities of NR sidelink transmissions and respective priorities of LTE sidelink transmissions. For example, $\Delta$ may be defined per priority level combination (e.g., $\Delta=\{\Delta_{a1}, \Delta_{a2}, \ldots, \Delta_{ij}, \cdots \}$). For example, the UE 610 may apply the same value of $\Delta$ for $r_{i,j}$ and $s_{i,j}$. Associating multiple RSRP threshold adaptation parameter values with respective RSRP thresholds may enable configuration (or pre-configuration) of specific RSRP threshold adaptation parameter values for each priority combination.

In some further examples, a first set of the RSRP threshold adaptation parameter values may be associated with one set of slots (e.g., slots that do not include any PSFCH resources), and another set of the RSRP threshold adaptation parameter value may be associated with another set of slots (e.g., slots that each include a PSFCH resource). For example, the value(s) of $\Delta$ may be different for resources in slots with and without PSFCH resources $$(e.g., \Delta^{PSSCH} = \{\Delta^{PSSCH}_{a1}, \Delta^{PSSCH}_{a2}, \ldots, \Delta^{PSSCH}_{ij}, \ldots\} \text{ and } \Delta^{PSFCH} =$$
$$\{\ldots \Delta^{PSFCH}_{ij} \ldots\}, \text{ where } \Delta^{PSSCH}_{ij}$$

may or may not equal $$\Delta^{PSFCH}_{ij}).$$

For example, the UE 610 may apply different values of $\Delta$ for $r_{i,j}$ and $s_{i,j}$. Associating a first set of the RSRP threshold adaptation parameter values with the first set of slots and a second set of the RSRP threshold adaptation parameter values with the second set of slots may enable further configuration (or pre-configuration) of specific RSRP threshold adaptation parameter values for each priority and slot set combination.

For clarity, it is noted that the one or more RSRP threshold adaptation parameters described herein may have one or more values that are same as or different from one or more values of one or more threshold adaptation parameters used for exclusion based on NR sensing.

As indicated above, FIG. 7 is provided as an example. Other examples may differ from what is described with respect to FIG. 7.

As used herein, "configured" may refer to a shorter-term configuration, such as a configuration received from another device (e.g., a gNB, eNB, or a UE, such as a platoon leader), and "pre-configured" may refer to a longer-term configuration, such as a configuration that is built into a modem of the UE 610 and configurable via a software or a firmware update or a configuration that is defined in a standards specification.

FIG. 8 is a diagram illustrating an example process 800 performed, for example, by a UE, in accordance with the present disclosure. Example process 800 is an example where the UE (e.g., UE 120) performs operations associated with resource exclusion for one or more sidelink transmissions.

As shown in FIG. 8, in some aspects, process 800 may include excluding, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots (block 810). For example, the UE (e.g., using transmission component 904 and/or communication manager 906, depicted in FIG. 9) may exclude, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots, as described above.

As further shown in FIG. 8, in some aspects, process 800 may include excluding, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots (block 820). For example, the UE (e.g., using reception component 902 and/or communication manager 906, depicted in FIG. 9) may exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots, as described above.

As further shown in FIG. 8, in some aspects, process 800 may include transmitting the first sidelink transmission in the transmit resource set (block 830). For example, the UE (e.g., using transmission component 904 and/or communication manager 906, depicted in FIG. 9) may transmit the first sidelink transmission in the transmit resource set, as described above.

Process 800 may include additional aspects, such as any single aspect or any combination of aspects described below and/or in connection with one or more other processes described elsewhere herein.

In a first aspect, the first set of slots does not include any PSFCH resource, and each slot of the second set of slots includes one or more PSFCH resources.

In a second aspect, alone or in combination with the first aspect, the second RSRP threshold is one of multiple second RSRP thresholds associated with the second set of slots.

In a third aspect, alone or in combination with one or more of the first and second aspects, the first RSRP threshold is one of multiple first RSRP thresholds associated with the first set of slots, and the second RSRP threshold is based at least in part on an offset from one of the first RSRP thresholds.

In a fourth aspect, alone or in combination with one or more of the first through third aspects, the offset is associated with each of the first RSRP thresholds.

In a fifth aspect, alone or in combination with one or more of the first through fourth aspects, the offset is one of multiple offsets associated with the respective first RSRP thresholds.

In a sixth aspect, alone or in combination with one or more of the first through fifth aspects, excluding the second resource includes excluding the second resource based at least in part on the second RSRP satisfying the second RSRP threshold.

In a seventh aspect, alone or in combination with one or more of the first through sixth aspects, excluding the second resource includes excluding the second resource based at least in part on the second RSRP satisfying a sum of the second RSRP threshold and an RSRP threshold adaptation parameter value.

In an eighth aspect, alone or in combination with one or more of the first through seventh aspects, the second RSRP threshold is one of multiple second RSRP thresholds associated with the second set of slots, and the RSRP threshold adaptation parameter value is associated with each of the second RSRP thresholds.

In a ninth aspect, alone or in combination with one or more of the first through eighth aspects, the RSRP threshold adaptation parameter value is one of multiple RSRP threshold adaptation parameter values associated with respective priorities of sidelink transmissions that are associated with the first RAT and respective priorities of sidelink transmissions that are associated with the second RAT.

In a tenth aspect, alone or in combination with one or more of the first through ninth aspects, a first set of the multiple RSRP threshold adaptation parameter values is associated with the first set of slots, and a second set of the multiple RSRP threshold adaptation parameter values is associated with the second set of slots.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
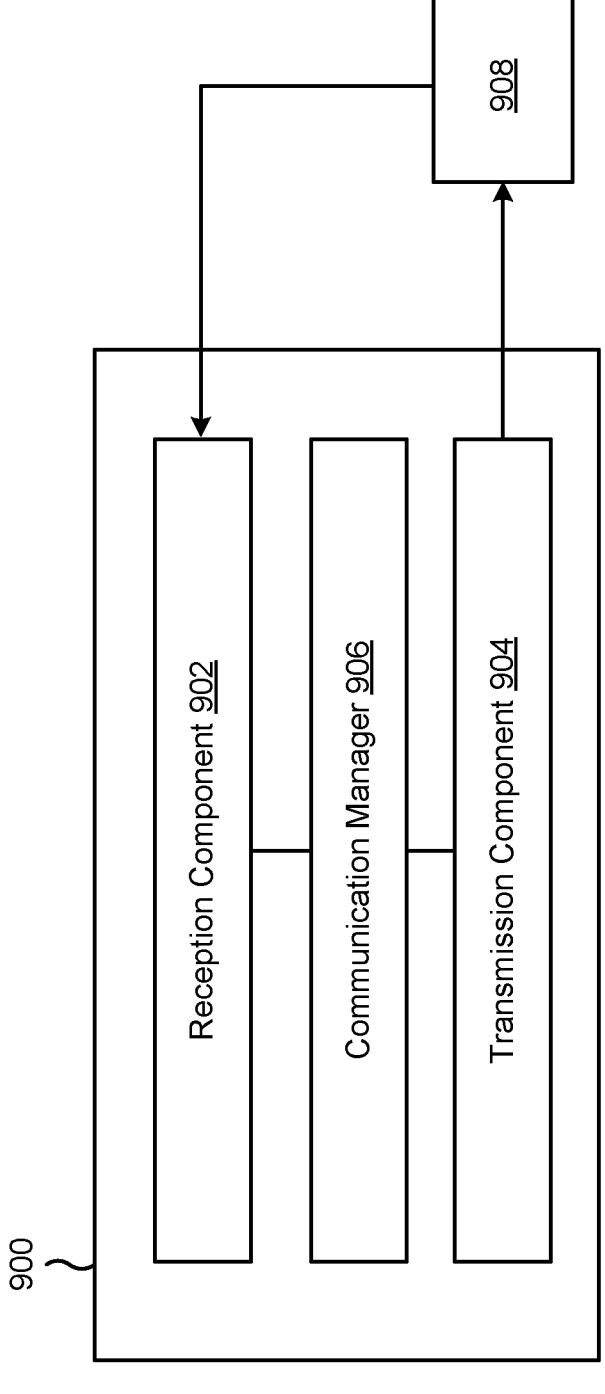
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE, using the reception component 902 and the transmission component 904.

In some aspects, the apparatus 900 may be configured to perform one or more operations described herein in connection with FIGS. 6 and 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may exclude, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots. The communication manager 906 may exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots. The transmission component 904 may transmit the first sidelink transmission in the transmit resource set.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: excluding, from a transmit resource set for a first sidelink transmission associated with a first RAT, a first resource that is reserved for a second sidelink transmission associated with a second RAT based at least in part on a first RSRP associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots; excluding, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots; and transmitting the first sidelink transmission in the transmit resource set.

Aspect 2: The method of Aspect 1, wherein the first set of slots does not include any PSFCH resource, and wherein each slot of the second set of slots includes one or more PSFCH resources.

Aspect 3: The method of any of Aspects 1-2, wherein the second RSRP threshold is one of multiple second RSRP thresholds associated with the second set of slots.

Aspect 4: The method of any of Aspects 1-3, wherein the first RSRP threshold is one of multiple first RSRP thresholds associated with the first set of slots, and wherein the second RSRP threshold is based at least in part on an offset from one of the first RSRP thresholds.

Aspect 5: The method of any of Aspect 4, wherein the offset is associated with each of the first RSRP thresholds.

Aspect 6: The method of any of Aspects 4, wherein the offset is one of multiple offsets associated with the respective first RSRP thresholds.

Aspect 7: The method of any of Aspects 1-6, wherein excluding the second resource includes: excluding the second resource based at least in part on the second RSRP satisfying the second RSRP threshold.

Aspect 8: The method of any of Aspects 1-7, wherein excluding the second resource includes: excluding the second resource based at least in part on the second RSRP satisfying a sum of the second RSRP threshold and an RSRP threshold adaptation parameter value.

Aspect 9: The method of Aspect 8, wherein the second RSRP threshold is one of multiple second RSRP thresholds associated with the second set of slots, and wherein the RSRP threshold adaptation parameter value is associated with each of the second RSRP thresholds.

Aspect 10: The method of Aspect 8, wherein the RSRP threshold adaptation parameter value is one of multiple RSRP threshold adaptation parameter values associated with respective priorities of sidelink transmissions that are associated with the first RAT and respective priorities of sidelink transmissions that are associated with the second RAT.

Aspect 11: The method of Aspect 10, wherein a first set of the multiple RSRP threshold adaptation parameter values is associated with the first set of slots, and wherein a second set of the multiple RSRP threshold adaptation parameter values is associated with the second set of slots.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

exclude, from a transmit resource set for a first sidelink transmission associated with a first radio access technology (RAT), a first resource that is reserved for a second sidelink transmission associated with a second RAT based at least in part on a first reference signal received power (RSRP) associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots;

exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots; and transmit the first sidelink transmission in the transmit resource set.

2. The UE of claim 1, wherein the first set of slots does not include any physical sidelink feedback channel (PSFCH) resource, and wherein each slot of the second set of slots includes one or more PSFCH resources.

3. The UE of claim 1, wherein the second RSRP threshold is one of multiple second RSRP thresholds associated with the second set of slots.

4. The UE of claim 1, wherein the first RSRP threshold is one of multiple first RSRP thresholds associated with the first set of slots, and wherein the second RSRP threshold is based at least in part on an offset from one of the first RSRP thresholds.

5. The UE of claim 4, wherein the offset is associated with each of the first RSRP thresholds.

6. The UE of claim 4, wherein the offset is one of multiple offsets associated with the respective first RSRP thresholds.

7. The UE of claim 1, wherein the one or more processors, to exclude the second resource, are configured to:

exclude the second resource based at least in part on the second RSRP satisfying the second RSRP threshold.

8. The UE of claim 1, wherein the one or more processors, to exclude the second resource, are configured to:

exclude the second resource based at least in part on the second RSRP satisfying a sum of the second RSRP threshold and an RSRP threshold adaptation parameter value.

9. The UE of claim 8, wherein the second RSRP threshold is one of multiple second RSRP thresholds associated with the second set of slots, and wherein the RSRP threshold adaptation parameter value is associated with each of the second RSRP thresholds.

10. The UE of claim 8, wherein the RSRP threshold adaptation parameter value is one of multiple RSRP threshold adaptation parameter values associated with respective priorities of sidelink transmissions that are associated with the first RAT and respective priorities of sidelink transmissions that are associated with the second RAT.

11. The UE of claim 10, wherein a first set of the multiple RSRP threshold adaptation parameter values is associated with the first set of slots, and wherein a second set of the multiple RSRP threshold adaptation parameter values is associated with the second set of slots.

12. A method of wireless communication performed by a user equipment (UE), comprising:

excluding, from a transmit resource set for a first sidelink transmission associated with a first radio access technology (RAT), a first resource that is reserved for a second sidelink transmission associated with a second RAT based at least in part on a first reference signal received power (RSRP) associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots;

excluding, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots; and transmitting the first sidelink transmission in the transmit resource set.

13. The method of claim 12, wherein the second RSRP threshold is one of multiple second RSRP thresholds associated with the second set of slots.

14. The method of claim 12, wherein excluding the second resource includes:

excluding the second resource based at least in part on the second RSRP satisfying the second RSRP threshold.

15. The method of claim 12, wherein excluding the second resource includes:

excluding the second resource based at least in part on the second RSRP satisfying a sum of the second RSRP threshold and an RSRP threshold adaptation parameter value.

16. The method of claim 15, wherein the second RSRP threshold is one of multiple second RSRP thresholds associated with the second set of slots, and wherein the RSRP threshold adaptation parameter value is associated with each of the second RSRP thresholds.

17. A non-transitory computer-readable medium that stores a set of instructions for wireless communication by a UE, wherein the set of instructions, when executed by one or more processors of the UE, causes the UE to:

exclude, from a transmit resource set for a first sidelink transmission associated with a first radio access technology (RAT), a first resource that is reserved for a second sidelink transmission associated with a second RAT based at least in part on a first reference signal received power (RSRP) associated with a reservation of the first resource for the second sidelink transmission and a first RSRP threshold, wherein the first RSRP threshold is associated with a first priority of the first sidelink transmission and a second priority of the second sidelink transmission and with a first set of slots associated with the first RAT, wherein the first resource is included in a slot of the first set of slots;

exclude, from the transmit resource set, a second resource that is reserved for a third sidelink transmission associated with the second RAT based at least in part on a second RSRP associated with a reservation of the second resource for the third sidelink transmission and a second RSRP threshold, wherein the second RSRP threshold is associated with the first priority of the first sidelink transmission and a third priority of the third sidelink transmission, wherein the second resource is included in a slot of a second set of slots; and transmit the first sidelink transmission in the transmit resource set.

18. The non-transitory computer-readable medium of claim 17, wherein the set of instructions causes the UE to exclude the second resource based at least in part on the second RSRP satisfying the second RSRP threshold.

19. The non-transitory computer-readable medium of claim 17, wherein the set of instructions causes the UE to exclude the second resource based at least in part on the second RSRP satisfying a sum of the second RSRP threshold and an RSRP threshold adaptation parameter value.

20. The non-transitory computer-readable medium of claim 19, wherein the second RSRP threshold is one of multiple second RSRP thresholds associated with the second set of slots, and wherein the RSRP threshold adaptation parameter value is associated with each of the second RSRP thresholds.

* * * * *